United States Patent
Wei (10) Patent No.: US 10,594,908 B2
(45) Date of Patent: Mar. 17, 2020

(54) LENS DRIVING DEVICE, CAMERA DEVICE AND ELECTRONIC APPARATUS

(71) Applicant: New Shicoh Motor Co., Ltd., Jiashan, Zhejiang (CN)

(72) Inventor: Hua Wei, Zhejiang (CN)

(73) Assignee: New Shicoh Motor Co., Ltd., Jiashan, Zhejiang (CN)

(*) Notice: Subject to any disclaimer, the term of this patent is extended or adjusted under 35 U.S.C. 154(b) by 0 days.

(21) Appl. No.: 16/214,138

(22) Filed: Dec. 10, 2018

(65) Prior Publication Data

US 2019/0191063 A1    Jun. 20, 2019

(30) Foreign Application Priority Data

Dec. 14, 2017    (CN) .......................... 2017 1 1336534

(51) Int. Cl.
*H04N 5/232*    (2006.01)
*H04N 5/225*    (2006.01)
(Continued)

(52) U.S. Cl.
CPC .............. *H04N 5/2253* (2013.01); *G02B 7/04* (2013.01); *G02B 7/08* (2013.01); *G02B 7/09* (2013.01);
(Continued)

(58) Field of Classification Search
CPC .......... H04N 5/23253; H04N 5/23287; H04N 5/2253; H04N 5/2254; G03B 13/36; G02B 7/04; G02B 7/08; G02B 7/09; G02B 27/646

USPC ..... 348/345, 208.99, 346, 326, 353, 208.14, 348/208.11, 373–376; 382/255; 359/697, 359/699, 694, 808, 811–830, 557;
(Continued)

(56) References Cited

U.S. PATENT DOCUMENTS 6,027,381 A    2/2000  Lok
10,114,229 B2*  10/2018  Jung .................... G02B 27/343
                                                          359/824

(Continued)

FOREIGN PATENT DOCUMENTS

CN    104914547 A    9/2015
JP    H06-120390 A   4/1994

(Continued)

OTHER PUBLICATIONS

Extended European Search Report dated Apr. 26, 2019.
Japanese Notice of reason for refusal dated Aug. 27, 2019.

*Primary Examiner* — Marly S Camargo
(74) *Attorney, Agent, or Firm* — Yokoi & Co., U.S.A.; Toshiyuki Yokoi (57) ABSTRACT

Disclosed are a lens driving device, a camera device and an electronic apparatus equipped with the lens driving device. When the lens driving device is mounted on the circuit board, the power supply terminal is less likely to fall off from the base. The lens driving device of the present disclosure includes a base, a lens support, and a driving mechanism that drives the lens support in the optical axial direction. The base is integrally provided with a power supply terminal mounted on an external circuit board and used for supplying power to the driving mechanism. A fall-off preventive portion is formed in at least a part of a contact portion that is in contact with the base on the power supply terminal.

10 Claims, 9 Drawing Sheets

(51) Int. Cl.
  *G03B 13/36* (2006.01)
  *G02B 27/64* (2006.01)
  *G02B 7/04* (2006.01)
  *G02B 7/08* (2006.01)
  *G02B 7/09* (2006.01)

(52) U.S. Cl.
  CPC ........... *G03B 13/36* (2013.01); *H04N 5/2254* (2013.01); *H04N 5/2257* (2013.01); *H04N 5/23287* (2013.01); *G02B 27/646* (2013.01)

(58) Field of Classification Search
  USPC ......... 396/82, 89, 79, 80, 93, 102, 103, 104, 396/529
  See application file for complete search history.

(56) References Cited

U.S. PATENT DOCUMENTS

| | | | |
|---|---|---|---|
| 2006/0204122 A1* | 9/2006 | Onozawa | H04N 5/23212 348/335 |
| 2008/0049325 A1* | 2/2008 | Hirai | G02B 7/02 359/507 |
| 2012/0105707 A1* | 5/2012 | Futami | H04N 5/232 348/345 |
| 2013/0016427 A1* | 1/2013 | Sugawara | G02B 27/64 |
| 2013/0156415 A1 | 6/2013 | Tanaka et al. | |
| 2014/0009631 A1 | 1/2014 | Topliss | |
| 2014/0030932 A1 | 1/2014 | Lee | |
| 2014/0049847 A1* | 2/2014 | Hsu | G02B 7/08 359/823 |
| 2016/0028178 A1 | 1/2016 | Lee | |
| 2017/0146770 A1 | 5/2017 | Kuo | |
| 2019/0129131 A1* | 5/2019 | Kuo | G02B 7/09 359/698 |

FOREIGN PATENT DOCUMENTS

| | | |
|---|---|---|
| JP | H09-246022 A | 9/1997 |
| JP | 2000-252036 A | 9/2000 |
| JP | 3161044 U | 7/2010 |
| JP | 2012-248474 A | 12/2012 |
| JP | 2014-228650 A | 12/2014 |

\* cited by examiner

LENS DRIVING DEVICE, CAMERA DEVICE AND ELECTRONIC APPARATUS

CROSS-REFERENCES TO RELATED APPLICATIONS

This patent specification is based on Chinese patent application, No. 2017-11336534.1 filed on Dec. 14, 2017 in the China Patent Office, the entire contents of which are incorporated by reference herein.

BACKGROUND OF THE INVENTION

1. Field of the Invention

The present disclosure relates to a lens driving device, a camera device and an electronic apparatus equipped with these devices.

2. Description of Related Art

A current lens driving device usually includes: a base; a focus adjustment unit including a driving mechanism for driving a lens support movably toward the optical axial direction; and a housing that is combined with the base to form a frame in a state where the focus adjustment unit is enclosed. The lens driving device is provided on a circuit board which is connected to a power supply through a power supply terminal disposed on the base. Thereby power is supplied to the driving mechanism of the focus adjustment unit so as to perform focus adjustment.

Figure 7:
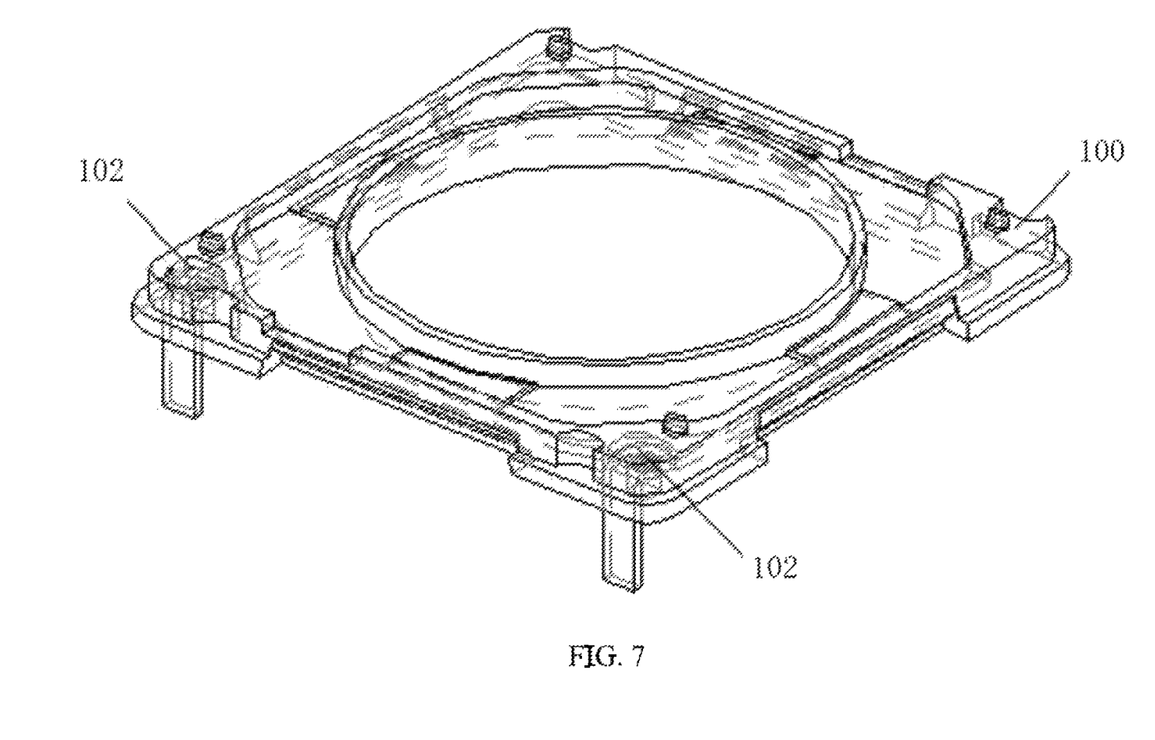
FIG. 7 is a perspective view showing the structure in which the power supply terminal and the base are integrated in the prior art.

For example, as shown in FIG. 7, Patent Document 1 discloses a configuration in which two terminals 102, the front portion of which is integrally molded with the base 100, are provided on the front side surface of the base 100.

Patent Document 1: CN104914547A

However, when the conventional lens driving device as described above is attached to a circuit board, the frame is grasped and attached to the circuit board. But with respect to a power supply terminal 102 which is in an abutted state and does not move, the base 100 is pressed from the front side toward the rear side circuit board. Whereby, the power supply terminal 102 may drop off from the base 100 inside the lens driving device.

BRIEF SUMMARY OF THE INVENTION

In view of the above problems, an object of the present disclosure is to provide a lens driving device, a camera device and an electronic apparatus in which a power supply terminal is less likely to drop off from the base when mounted on a circuit board.

To achieve the above object, the lens driving device of the present disclosure includes a base, a lens support, and a driving mechanism that drives the lens support in the optical axial direction. The base is integrally provided with a power supply terminal mounted on an external circuit board and used for supplying power to the driving mechanism. A fall-off preventive portion is formed in at least a part of a contact portion that is in contact with the base on the power supply terminal.

Preferably, the power supply terminal has a vertical portion extending forward from the rear of the optical axial direction, and a horizontal portion extending from a front end of the vertical portion in a direction orthogonal to the optical axis and exposed from a front surface of the base. The vertical portion has an external connection portion exposed from the base and mounted on the circuit board, and an internal structural portion inside the base and in contact with the base. The fall-off preventive portion is a forward-facing surface provided in the internal structural portion.

Preferably, the forward-facing surface is provided in a side groove which is formed by cutting off a part of the vertical portion of the power supply terminal.

Preferably, the forward-facing surface is provided on a protrusion which is formed to protrude from the vertical portion of the power supply terminal.

Preferably, the forward-facing surface is provided in a through-hole which is formed through the vertical portion of the power supply terminal.

Preferably, the forward-facing surface is formed along a second contour line that is changed in orientation such that a first contour line extending from the rear of the vertical portion of the power supply terminal extends inward.

Further, preferably, the power supply terminal has a vertical portion extending forward from the rear of the optical axial direction, and a horizontal portion extending from a front end of the vertical portion in a direction orthogonal to the optical axis and exposed from a front surface of the base. The horizontal portion has an inclined portion which extends obliquely rearward from a portion not connected to the vertical portion and is in contact with the base. The fall-off preventive portion is a forward-facing surface provided in the inclined portion.

Further, in order to achieve the above object, the present disclosure provides a camera device and an electronic apparatus including the lens driving device having the above-described configuration.

According to the present disclosure, since the fall-off preventive portion is formed in at least a part of the contact portion which is in contact with the base of the power supply terminal integrated with the base, the power supply terminal is less likely to fall off.

The description of the reference numerals is as follows:

1 lens driving device;
10 base;
10A rear end surface;
12, 12' power supply terminal;

12A vertical portion;
12B horizontal portion;
12C external connection portion;
12D internal structural portion;
12E side groove;
12F first contour line;
12G second contour line;
12H,12J forward-facing surface;
12I inclined portion;
20 lens focus adjustment unit;
21 lens support;
22 front side spring;
23 rear side spring;
24 driving magnet;
25 driving coil;
30 housing.

DETAILED DESCRIPTION OF THE INVENTION

Hereinafter, in order to make the present disclosure easier to understand, some embodiments of the present disclosure will be described with reference to the drawings.

Figure 1:
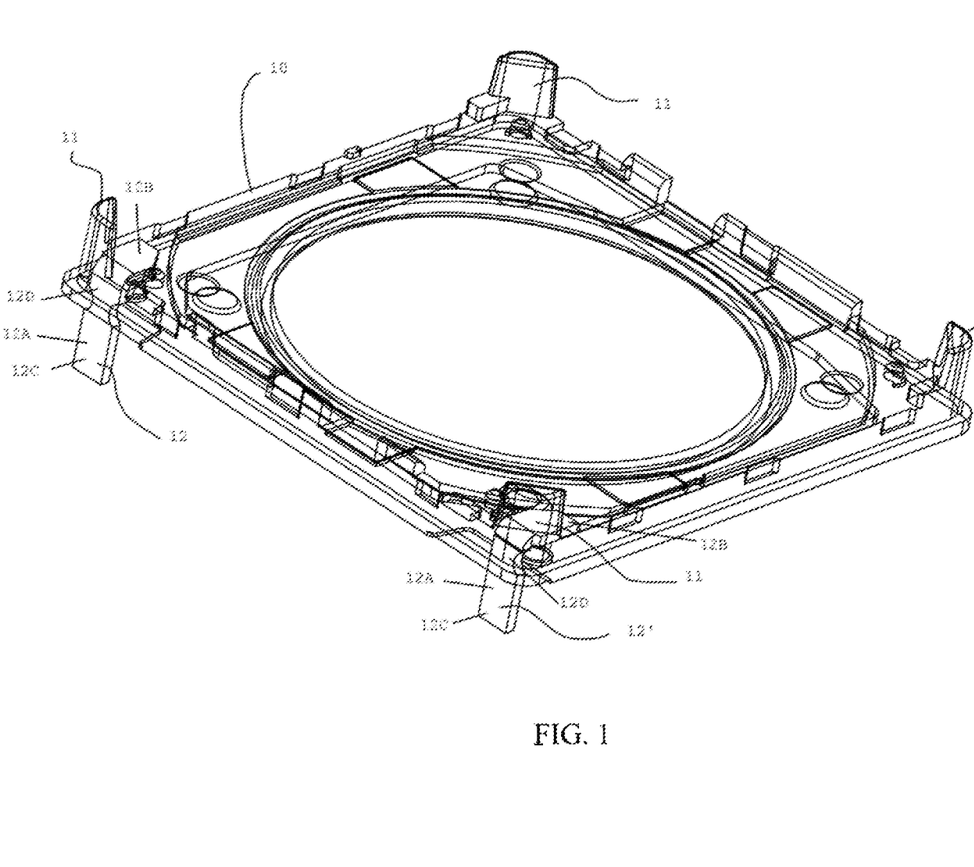
FIG. 1 is a perspective view showing a structure in which a power supply terminal and a base are integrated and the base is made transparent according to an embodiment of the present disclosure.
Figure 2:
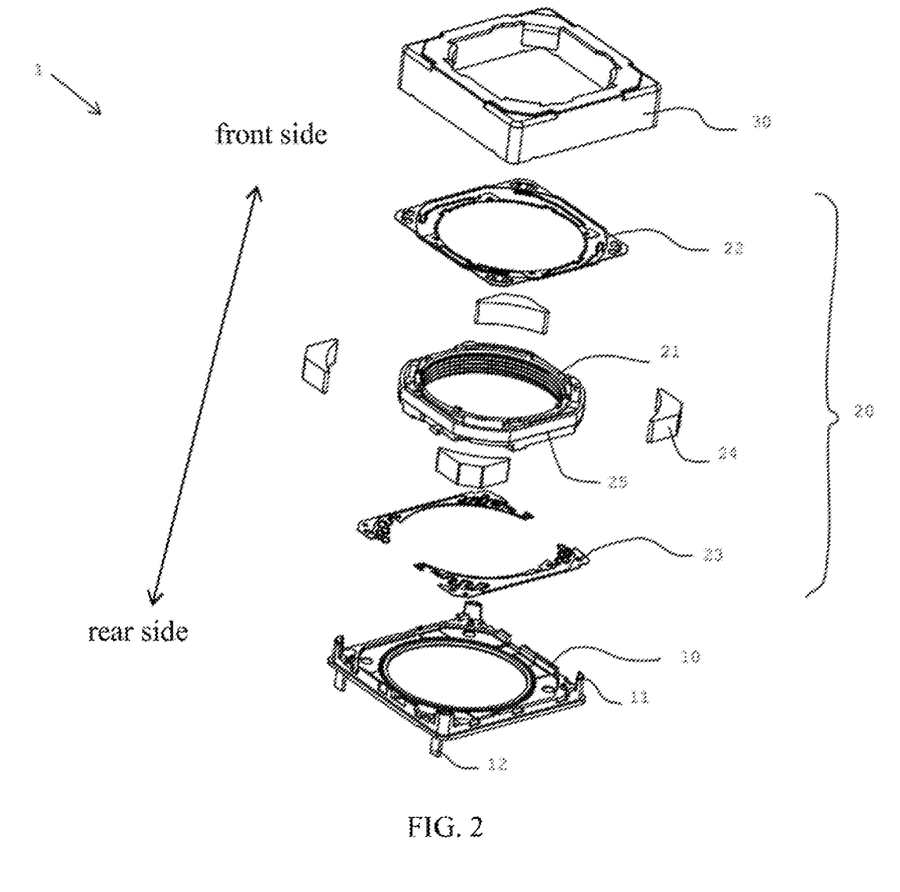
FIG. 2 is a perspective view showing an exploded structure of a lens driving device according to an embodiment of the present invention.

The lens driving device 1 is used for, for example, a camera device that is mounted on an electronic apparatus such as a smartphone to implement a focus adjustment function. As shown in FIG. 2, the lens driving device 1 according to one embodiment of the present disclosure includes a base 10, a focus adjustment unit 20 and a housing 30 in this order from the rear side to the front side. In the present specification, in the lens driving device 1, with respect to the optical axial direction (direction of the arrow in FIG. 2) of the lens (not shown), the side of the base 10 is referred to as the rear side and the side of the housing 30 is referred to as the front side.

The base 10 has a plate-like quadrangular shape and forms a frame together with the housing 30. A through-hole penetrating in the optical axial direction for transmitting light from a lens (not shown) is formed in the center portion. Protruding portions 11 for fixing the housing 30 at the four corner portions are provided on the front side of the base 10. On the rear side of the base 10, the power supply terminals 12, 12' protrude side by side from the base 10 in the vicinity of the adjacent two corner portions.

In the present embodiment, the power supply terminal 12, 12' are integrally fixed to the base 10 by insert molding (integral molding). For example, the power supply terminals 12, 12' made of metal are provided in the resin molding die for molding the base 10, and then a resin serving as a base material of the base 10 is injected and molded into the molding die. Thereby, it is possible to integrate the base 10 and the power supply terminals 12, 12' and fix the power supply terminals 12, 12' to the base 10. In the power supply terminals 12, 12', the half portion of the front side is integrated into the base 10 in contact with the base 10, and the half portion of the rear side is exposed to protrude from the base 10.

Figure 3A:
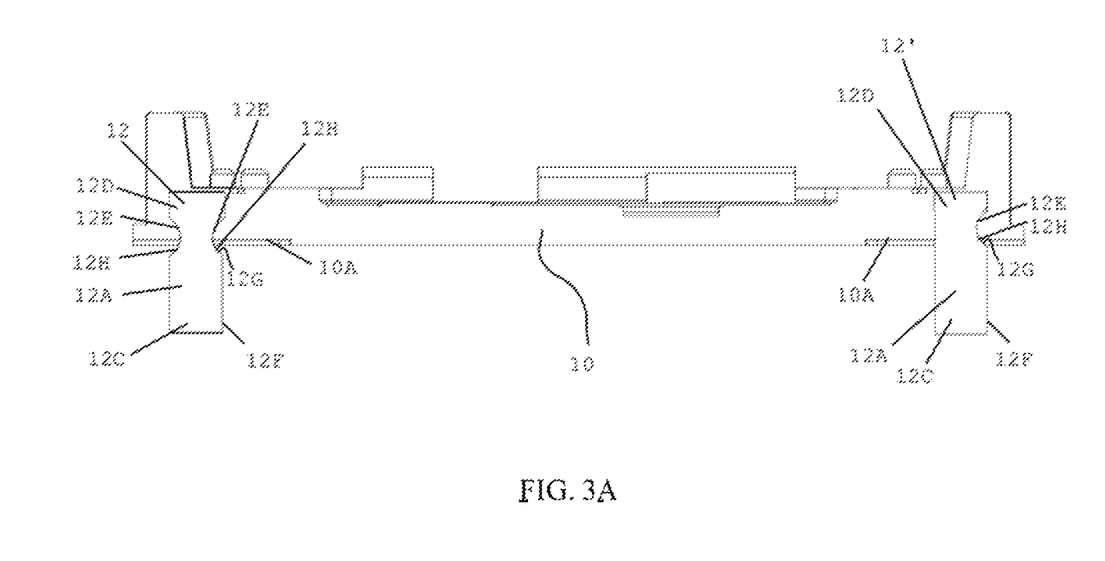
FIG. 3A is a cross-sectional view showing the structure in which the power supply terminal and the base according to the embodiment of the present invention are integrated.
Figure 3B:
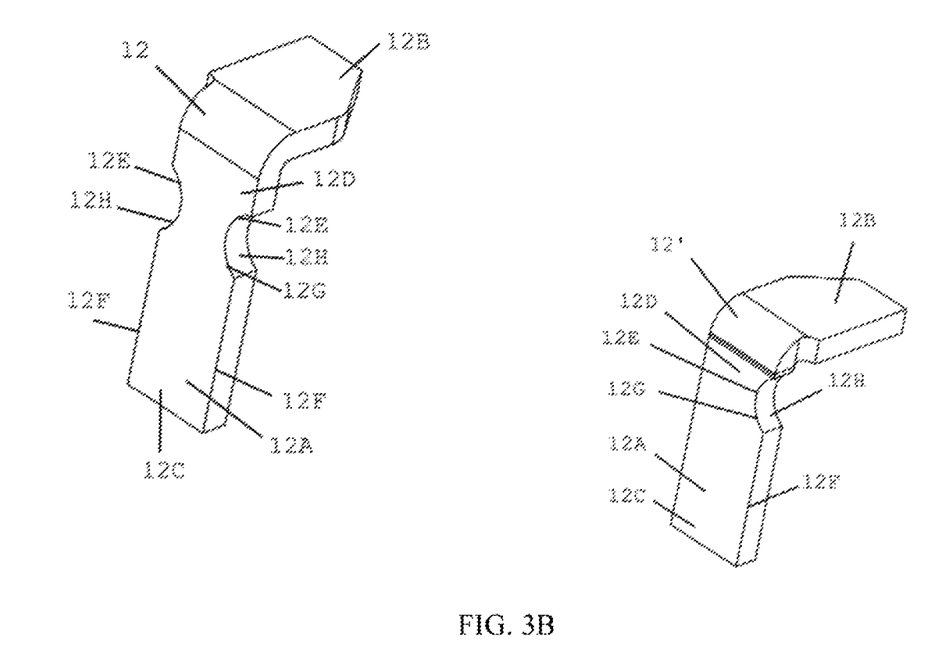
FIG. 3B is a perspective view of the power supply terminal shown in FIG. 3A.

Next, the power supply terminal 12 will be described. As shown in FIG. 3B, the power supply terminal 12 has a vertical portion 12A extending forward from the rear of the optical axial direction, and a horizontal portion 12B extending from the front end of the vertical portion 12A in a direction orthogonal to the optical axis. That is, the power supply terminal 12 has such a shape that the vertical portion 12A and the horizontal portion 12B are formed by bending a plate at 90 degrees. The horizontal portion 12B is exposed from the front surface of the base 10, as shown in FIG. 2. As shown in FIG. 3A, the vertical portion 12A has an external connection portion 12C exposed from the base 10 and mounted on the circuit board, and an internal structural portion 12D inside the base 10 and in contact with the base 10. In FIG. 3A, the external connection portion 12C is located more rearward than the rear end surface 10A of the base 10 in a position where the power supply terminal 12 is present, the internal structural portion 12D is located more forward than the rear end surface 10A, and the internal structural portion 12D is located inside the base 10.

As shown in FIG. 3A, both side portions of the vertical portion 12A of the power supply terminal 12 are formed with side grooves 12E cut out in a semicircular shape. The side grooves 12E function as fall-off preventive portions as will be described later. The rear end surface 10A of the base 10 is more rearward than the center of the semicircular shape of the side groove 12E. That is, the power supply terminal 12 enters the inside of the base 10 in the middle of the second contour line 12G which is changed in orientation so that the first contour line 12F extending from the rearward of the vertical portion 12A extends inward, and furthermore, the second contour line 12G extends also inside the base 10. The surface formed including the second contour line 12G is the forward-facing surface 12H. As least a part of the forward-facing surface 12H is provided inside the base 10, and the at least a part is the internal structural portion 12D. The power supply terminal 12' has a similar structure and the side groove 12E serving as the fall-off preventive portion is provided on one side of the vertical portion. Although the power supply terminal 12 and the power supply terminal 12' have been described as being provided in the same lens driving device 1 for convenience of description, generally any shape is adopted.

Thus, the number of formation of the side grooves 12E is not particularly limited. In addition, the shape of the side groove 12E is not particularly limited as long as it satisfies the conditions to be described later. For example, the cross section may be semicircular, triangular or quadrangular, or the like.

As shown in FIG. 2, the focus adjustment unit 20 has a driving mechanism for driving the lens support 21 in the optical axial direction, a lens support 21, and a supporting mechanism for supporting the lens support 21 movably toward the optical axial direction. The lens support 21 has a substantially cylindrical shape and is used for mounting and supporting a lens (not shown) on the inner periphery thereof. The driving mechanism has a driving magnet 24 fixed to the inner surface of the housing 30 and a driving coil 25 opposed to the driving magnet 24 and fixed to the lens support 21. The supporting mechanism has a front side spring 22 and a rear side spring 23 formed of metal. In the present embodiment, the rear side spring 23 is divided into two parts in the left and right directions, respectively. Each of the two parts includes: an outer peripheral side portion fixed on the side of the base 10 and is electrically connected to the horizontal portion 12B of the power supply terminal 12; an inner peripheral side portion fixed on the side of the lens support 21 and is electrically connected to the driving coil 25; and an arm portion connecting the outer peripheral side portion and the inner peripheral side portion.

The housing 30 is disposed in front of the lens focus adjustment unit 20, has a box shape corresponding to the base 10, and has one end with a through-hole formed in the center through which light entering the lens from the subject passes, and the other end which is open. In addition, housing 30 is configured to be combined with the base 10 so that the inside is hollow. The lens adjustment unit 20 is arranged in the hollow portion. The shape of the other end of the housing 30 is substantially the same as the shape of the outer peripheral end of the base 10, and when assembled, the other end is combined with the protruding portion 11 of the base 10.

The lens driving device 1 configured as above is mounted on a circuit board (not shown) connected to an external power source. The current flows from the external power source through the circuit board to the power supply terminal 12, and flows from one of the rear side spring 23 divided into two to the driving coil 25. The current flows from the driving coil 25, through the other of the rear side spring 23 and power supply terminal 12', and flows back to the external power source from the circuit board. Thus, it is possible to supply power to the driving mechanism for driving the lens support 21 along the optical axial direction so as to generate driving force of electromagnetic force, thereby performing focus adjustment.

Figures 4A, 4B, 4C:
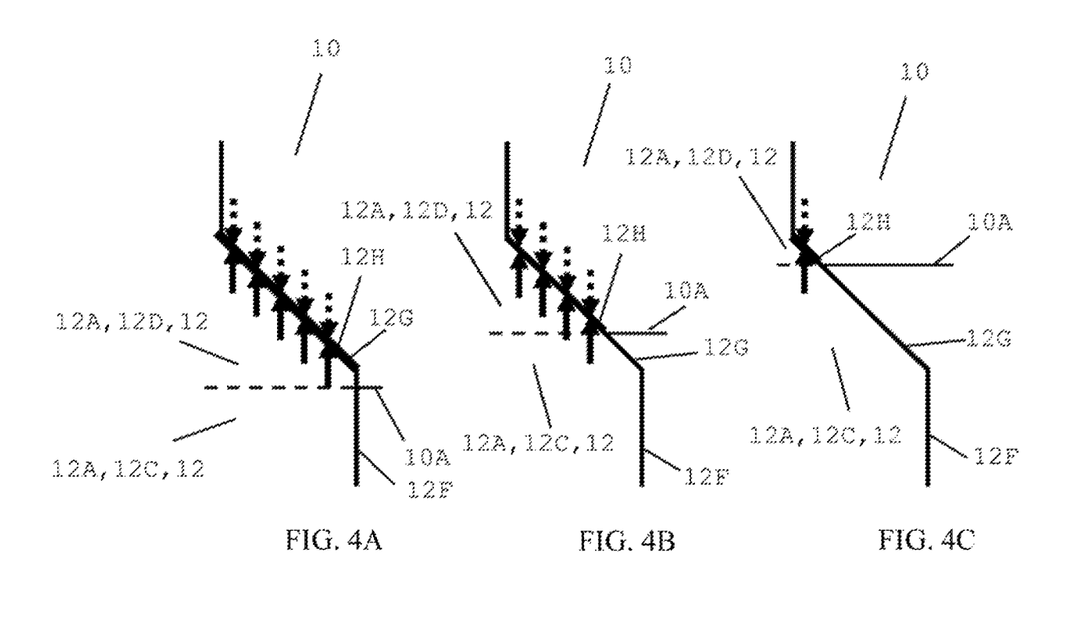
FIGS. 4A-4C are schematic views showing the operation of a fall-off preventive portion according to the embodiment of the present disclosure.

Next, the fall-off preventive portion will be described. As shown in FIG. 4A, the rear end surface 10A of the base 10 is arranged so as to cross the first contour line 12F of the vertical portion 12A of the power supply terminal 12, the front side is the internal structural portion 12D, and the rear side is the external connection portion 12C. The second contour line 12G inwardly extends inside the base 10, and forms the forward-facing surface 12H at this portion. The frame of the lens driving device 1 having such a fall-off preventive portion is grasped and mounted on the circuit board. At this time, when the power supply terminal 12 abuts the circuit board from the front side (upper side of the paper), although it does not move any further, the base 10 constituting a part of the frame is applied with a force toward the rear side indicated by a dotted line so as to further move to the rear side (lower side of the paper). However, since a counteracting force toward the front side indicated by a solid arrow is generated on the forward-facing surface 12H, the base 10 does not move further rearward. That is, the power supply terminal 12 also does not fall off. Such force is not generated on the surface extending in the front-rear direction or on the surface facing rearward.

Since it is sufficient only to generate such counteracting force, it may be a configuration in which the entire forward-facing surface 12H is not located inside the base 10 as shown in FIG. 4B, or a configuration in which an extremely small part of the forward-facing surface 12H is located inside the base 10 as shown in FIG. 4C. Although the forward-facing surface 12H is drawn so as to face obliquely forward in FIGS. 4A-4C, it may be a surface 12H facing straight forward.

Figure 5A:
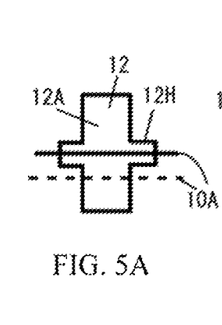
FIGS. 5A-5E are schematic views showing a modification of the shape of the fall-off preventive portion of the power supply terminal according to the embodiment of the present disclosure.
Figure 5B:
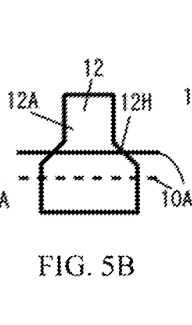
Figure 5C:
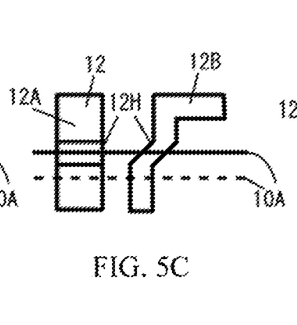
Figures 5D, 5E:
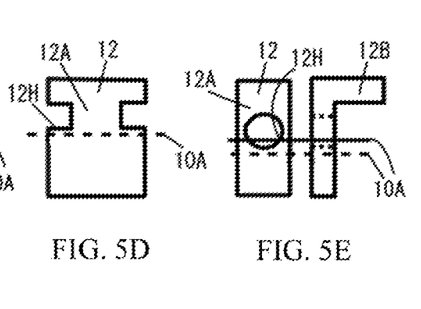

FIG. 5A to FIG. 5E are schematic views showing the modified examples of the shape of the power supply terminal 12 according to the embodiments of the present disclosure. FIG. 5A, FIG. 5B, the left side of FIG. 5C, FIG. 5D and the left side of FIG. 5E are views of the power supply terminal 12 observed from the same direction as in FIG. 3A, and the right side of FIG. 5C and the right side of FIG. 5E are views observed from the side direction thereof. As shown in the figures, the shape of the fall-off preventive portion of the power supply terminal 12 is not particularly limited. The shape of the fall-off preventive portion of the power supply terminal 12 has a surface 12H facing upward. The rear end surface 10A of the base 10 indicated by the dotted line in each figure shows that the entire fall-off preventive portion is inside the base 10. The rear end surface 10A indicated by the solid line in each figure except for FIG. 5D shows that a part of the fall-off preventive portion (forward-facing surface 12H) is inside the base 10.

For example, as shown in FIG. 5A, a protrusion formed to protrude from the side wall of the power supply terminal 12 may be adopted. The forward-facing surface 12H is formed at the front portion of the protrusion, and at least a part of the fall-off preventive portion is formed inside the base 10, so that an effect is exerted. In addition, as shown in FIG. 5B, such an inclined surface that the width of the power supply terminal 12 narrows toward the front side may also be adopted. In addition, as shown in FIG. 5C, it may also be provided so as to have a forward-facing surface 12H as observed from the side direction. In addition, FIG. 5D is a side groove similar to the side groove 12E shown in FIGS. 3A and 3B at the beginning, but the forward-facing surface 12H faces straight forward and is formed at the rear end of the fall-off preventive portion. Therefore, in this case, the entire fall-off preventive portion is provided inside the base 10. In addition, as shown in FIG. 5E, the through-hole formed in the vertical portion 12A of the power supply terminal 12 may also be used as the fall-off preventive portion. Thus, the resin serving as the base material of the base 10 injected into the molding die is injected into the through-hole, and the resin on the front side of the power supply terminal 12 and the resin on the rear side are connected to each other at the through-hole, so that the base 10 and the power supply terminal 12 can be fixed more firmly.

Figure 6A:
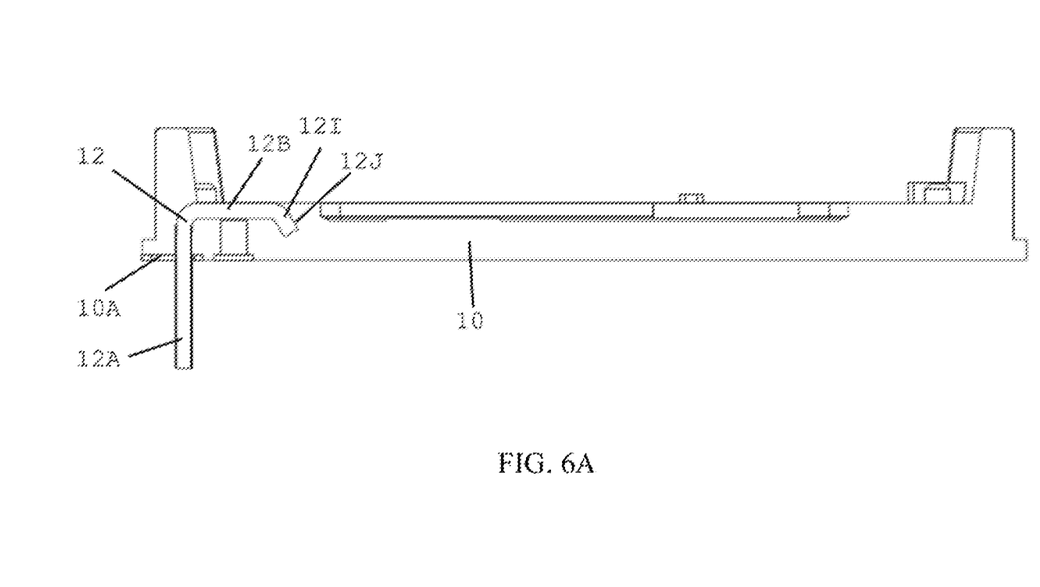
FIGS. 6A and 6B are views showing the structure of a power supply terminal according to another embodiment of the present disclosure.
Figures 6A, 6B:
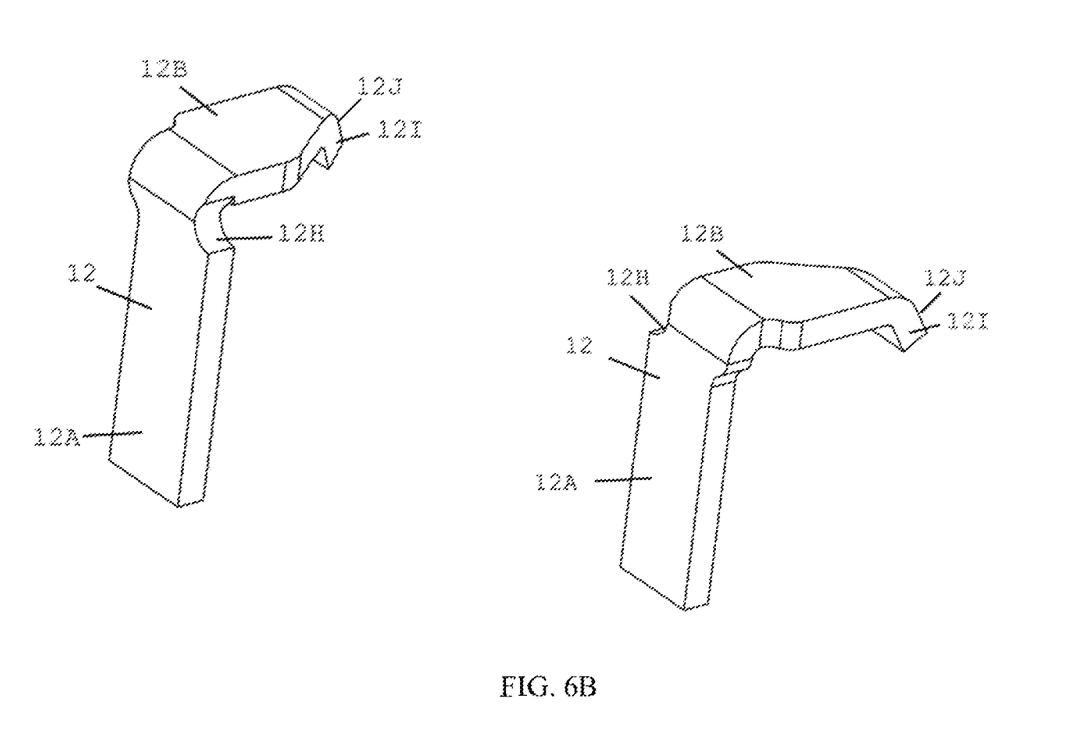

Next, the shapes of the power supply terminals 12 according other embodiments of the present disclosure will be described. As shown in FIG. 6A and FIG. 6B, the power supply terminal 12 has a vertical portion 12A and a horizontal portion 12B. Further, the horizontal portion 12B has an inclined portion 12I which extends obliquely rearward from a portion not connected to the vertical portion 12A and is in contact with the base 10. The fall-off preventive portion is a forward-facing surface 12J provided on the inclined portion 12I. Similar to the forward-facing surface 12H, the power supply terminal 12 is less likely to fall off from the base 10 by the forward-facing surface 12J. In the example shown in FIGS. 6A and 6B, the inclined portion 12I is provided on the side opposite to the vertical portion 12A with the horizontal portion 12B therebetween, but it may be provided immediately adjacent thereto. In addition, in the example shown in FIGS. 6A and 6B, the inclined portion 12I is provided so as to extend obliquely rearward straight from the horizontal portion 12B, but, for example, it may be provided so as to extend vertically rearward from the horizontal portion 12B and further extend in the horizontal direction.

In addition, as shown in FIGS. 6A and 6B, both the surface 12J facing the front side of the inclined portion 12I and the surface 12H facing the front side of the vertical portion 12A may be provided. By virtue of the synergistic effect of the two surfaces, it is possible to realize a configuration in which drop-off is more difficult to occur.

Thus, although the preferred embodiments of the present disclosure have been described in detail, the purpose is to enable those skilled in the art to practice the present disclosure on the basis of understanding the contents of the present disclosure. Of course, the protection scope the present disclosure is not limited to the embodiments and examples described above, but can be modified or improved based on the spirit of the present disclosure, and all the modifications and improvements are included in the protection scope of the present disclosure.

What is claimed is:

1. A lens driving device comprising:
   a base;
   a lens support; and
   a driving mechanism for driving the lens support along an optical axial direction, wherein
   the base is integrally provided with a power supply terminal mounted on an external circuit board and used for supplying power to the driving mechanism, and
   a fall-off preventive portion is formed in at least a part of a contact portion that is in contact with the base on the power supply terminal, wherein
   the power supply terminal has a vertical portion extending forward from the rear of the optical axial direction, and a horizontal portion extending from a front end of the vertical portion in a direction orthogonal to the optical axis and exposed from a front surface of the base,
   the vertical portion has an external connection portion exposed from the base and mounted on the circuit board, and an internal structural portion inside the base and in contact with the base,
   the fall-off preventive portion is a forward-facing surface provided in the internal structural portion.

2. The lens driving device according to claim 1, wherein the forward-facing surface is provided in a side groove of the power supply terminal which is formed by cutting off a part of the vertical portion.

3. The lens driving device according to claim 1, wherein the forward-facing surface is provided on a protrusion which is formed to protrude from the vertical portion of the power supply terminal.

4. The lens driving device according to claim 1, wherein the forward-facing surface is provided in a through-hole formed the power supply terminal through the vertical portion.

5. The lens driving device according to claim 1, wherein the forward-facing surface is formed along a second contour line that is changed in orientation such that a first contour line extending from the rear of the vertical portion of the power supply terminal extends inward.

6. A camera device comprising the lens driving device of claim 1.

7. An electronic apparatus comprising the camera device of claim 6.

8. A lens driving device comprising:
   a base;
   a lens support; and
   a driving mechanism for driving the lens support along an optical axial direction, wherein
   the base is integrally provided with a power supply terminal mounted on an external circuit board and used for supplying power to the driving mechanism, and
   a fall-off preventive portion is formed in at least a part of a contact portion that is in contact with the base on the power supply terminal, wherein
   the power supply terminal has a vertical portion extending forward from the rear of the optical axial direction, and a horizontal portion extending from a front end of the vertical portion in a direction orthogonal to the optical axis and exposed from a front surface of the base,
   the horizontal portion has an inclined portion which extends obliquely rearward from a portion not connected to the vertical portion and is in contact with the base,
   the fall-off preventive portion is a forward-facing surface provided in the inclined portion.

9. A camera device comprising the lens driving device of claim 8.

10. An electronic apparatus comprising the camera device of claim 9.

* * * * *